Feb. 4, 1930.   S. RAUH   1,746,225
MIRROR
Original Filed Feb. 10, 1928
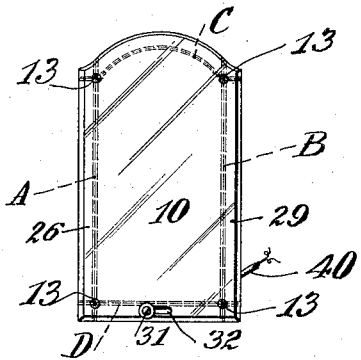
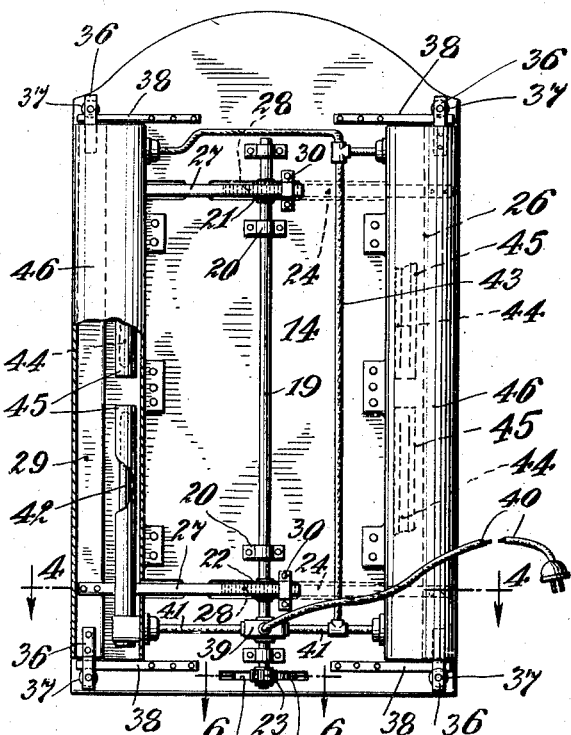
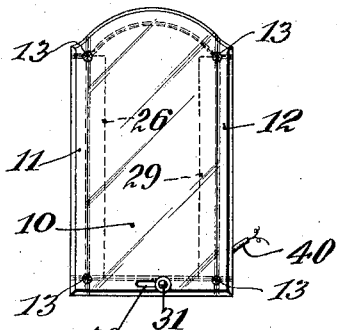
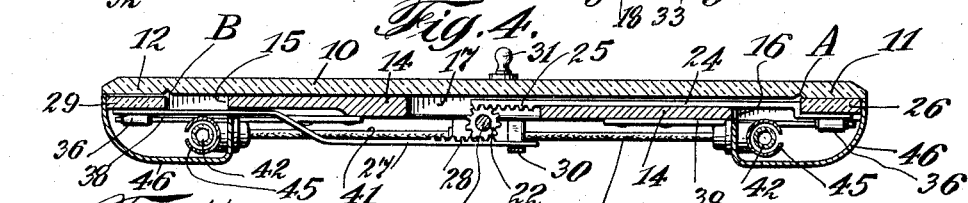
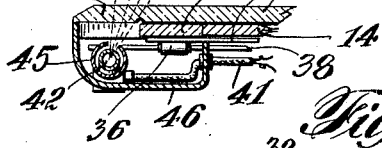
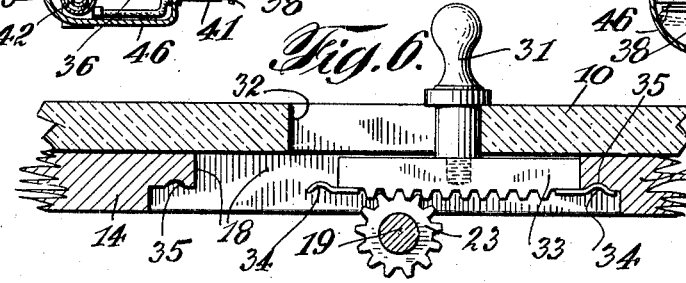
INVENTOR
Stanley Rauh
BY
his ATTORNEY Patented Feb. 4, 1930

1,746,225

UNITED STATES PATENT OFFICE

STANLEY RAUH, OF NEW YORK, N. Y.

MIRROR

Application filed February 10, 1928, Serial No. 253,371. Renewed December 30, 1929.

My invention relates to mirrors and refers particularly to mirrors capable of employment with electric lights.

Considerable inconvenience is frequently occasioned by the use of mirrors with artificial light, the lighting means being so positioned as not to properly illuminate the person employing the mirror.

When the lights are fixed in the walls or ceilings, it is frequently necessary to place the mirror in undesirable positions in the room, and electric stand lamps are objectionable as they occupy considerable space upon the dressing table and unless used in pairs illuminate but one side of the face.

All of the above, and other, objectionable results are overcome by the device of my invention.

My invention presents a device which can be placed in any part of a room as long as it is connected with an electric light circuit, and thus it can be placed with favorable respect to natural light, irrespective of fixed artificial lighting means.

The lighting means of my device does not occupy any space upon the table or other supporting means of the mirror, and is equally applicable to wall mirrors.

The lighting mechanism is hidden from view and, hence, the attractiveness of the mirror may be retained.

Preferably, I prefer to so arrange my lighting means that the light will be reflected directly upon both sides of the face of the user, thus obtaining full benefit of the illumination.

These and other advantages of my device will be evident upon a consideration of my specification and its accompanying drawings.

In the modified forms of the device of my invention shown in the accompanying drawings similar parts are designated by similar numerals.

Figure 1 is a front view of one form of my device when in unlighted position.

Figure 2 is a front view of the device of Figure 1 when in lighted position.

Figure 3 is an enlarged rear view of Figure 1, partly broken away for clearness of description.

Figure 4 is a section through the line 4—4 of Figure 3.

Figure 5 is a fragmentary section similar to Figure 4 when in lighted position.

Figure 6 taken on the line 6—6 of Figure 3 is a horizontal section through the lower portion of my device showing the operating pin mechanism.

Figure 7 is a view similar to Figure 5 of a modified form of my device.

The particular form of the device of my invention shown in the accompanying drawings comprises a sheet of glass 10 having the bevels A, B, C and D. All of the glass is a mirror except the edge portions 11 and 12 between the bevels and the edge of the sheet of glass which are of clear glass.

Fastened to the glass 10 by means of the rivets 13, 13, 13, 13, is a board back 14 having the longitudinal side cut-out recesses 15 and 16, and the transverse cut-outs 17 and 18.

A revoluble shaft 19 is attached to the back board 14 by means of the strap-supports 20, 20 and carries the pinions 21, 22 and 23.

Slidably movable along the rear face of the glass 14, but not touching the same, are guide-bars 24, 24, the one end of which carries a rack 25 meshing with a pinion 21 or 22, the other end of the guide-bars carrying a strip of mirrored glass 26 at least as wide as the clear portion 11 of the mirror 10. A portion of the back 14 is cut away to accommodate the guide-bars 24, 24.

Similar guide-bars 27, 27, carry the racks 28, 28, meshing with the pinions 21 and 22, the other end of the guide-bars carrying the strip of mirrored glass 29 at least as wide as the clear portion 12 of the mirror 10.

The guide-bars 24 and 27 are carried by the strips 26 and 29 and by the strap supports 30, 30.

A pin 31, extending through the opening 32 of the mirror 10, carries a rack 33 meshing with the pinion 23 and has two bent spring catches 34, 34, each capable of fitment within a recess 35 of the back 14.

The top and bottom of each mirror slide, or light slide, 26 and 29 carries a hook-shaped bearing 36 covering a wheel 37 movable along the track 38 which is attached to the back 14.

The shaft 19 passes through a make-and-break electric switch 39, connected with an electric circuit by means of the wire 40, so that when the slides 26 and 29 are in their extended position the circuit will be broken and when they are in their withdrawn position the circuit will be made.

The wires 41, 41 connect the switch 39 with the two electric light bulbs 42, 42 and the wire 43 connects the switch with the electric light bulbs 44, 44.

In the form of my device shown in Figures 1, 2, 3, 4 and 5, the electric light bulbs 42, 42, 44, 44 are enclosed in a hood 45 having a longitudinal opening, the hood having a polished or reflecting inner face, and are positioned behind the mirror 10, so as not to be visible from the front of the device. A reflector 46 encompasses these bulbs and is so positioned and of such shape that light rays emitted by the bulbs will be reflected forwardly of the device through the clear glass portions 11 and 12 of the mirror 10 angularly with respect to the plane of the mirror as indicated by the arrows in Fig. 5 and will be impinged upon the face of a person before said mirror.

In the modification shown in Figure 7, the bulbs 42, 42, are positioned directly behind the clear portions 11 and 12 of the glass 10.

The operation of the device is as follows:—

When the pin 31 is in the position shown in Figures 1, 3, 4 and 6, the mirror slides 26 and 29 are positioned behind the clear glass portions 11 and 12 of the mirror, giving the appearance of a complete mirror, the bevels hiding the jointure between the slides and the mirror. When in this position the electric lights are inoperative.

In order to allow the use of the device by means of electric illumination, the pin 31 is moved into the position shown in Figures 2 and 5. This moves the slides 26 and 29 away from the clear portions of the glass 10 and behind the mirrored portion thereof, while at the same time the electric light circuit is made, the illumination passing outwardly through said clear portions and upon the face of a person before the device.

It will thus be seen that my invention presents a device having the visual effect of a complete mirror when employed with natural light but which can be converted into a reflecting device in which artificial light is passed through a portion of the device upon the face of the user, and that my device may be so employed without respect to its position in a room if it is connected to an electric light circuit.

If desired the slides 26 and 29 may carry border decoration materials corresponding to the border decorations upon the outer portion of the glass 10.

I do not limit myself to the particular size, shape, number, arrangement or material of parts as shown and described as these are given simply as a means for clearly describing the device of my invention.

What I claim is:—

1. In a mirror, in combination, a mirror having clear vision parts therein, slides capable of movement across said clear portions preventing the passage of light therethrough, electric lighting means behind the device so positioned that light emitted thereby will pass through said clear parts when said slides are withdrawn and means illuminating and extinguishing said lighting means.

2. In a mirror, in combination, a mirror having clear vision parts therein, mirrored slides capable of movement across said clear portions preventing the passage of light therethrough, electric lighting means behind the device so positioned that light emitted thereby will pass through said clear parts when said slides are withdrawn and means for illuminating and extinguishing said lighting means.

3. In a mirror, in combination, a mirror having clear vision parts therein, slides capable of movement across said clear parts preventing the passage of light therethrough, electric lighting means behind the device so positioned that light emitted thereby will pass through said clear parts when said slides are withdrawn and means whereby the movements of the slides will coincide with the making and breaking of the electric lighting circuit.

4. In a mirror, in combination, a mirror having clear vision parts therein, slides capable of movement across said clear parts preventing the passage of light therethrough, electric lighting means behind the device so positioned that light emitted thereby will pass through said clear parts when said slides are withdrawn and means whereby the movement of which will withdraw the slides and light the electric light, and will cover the clear part of the mirror with the slide and extinguishing the electric light.

5. In a mirror, in combination, a mirror having clear vision parts therein, slides capable of movement across said clear parts preventing the passage of light therethrough, electric lighting means behind the device so positioned that light emitted thereby will pass through said clear parts toward the central portion of the mirror when said slides are withdrawn and means whereby the movement of the slides will coincide with the making and breaking of the electric lighting circuit.

6. In a mirror, in combination, a mirror having clear vision parts therein, slides capable of movement across said clear parts preventing the passage of light therethrough, electric lighting means behind the device so positioned that light emitted thereby will pass through said clear parts toward the central portion of the mirror when said slides are withdrawn and means whereby the electric lighting circuit will be made when the slides are in withdrawn position and will be broken when the slides cover the clear parts of the mirror.

7. In a mirror, in combination, a mirror side portions of which are transparent, opaque slides capable of movement across said transparent portions, electric lighting means behind the device so positioned that light emitted thereby will pass through said transparent portions when said slides are withdrawn from across said transparent portions and means whereby the electric lighting circuit will be made when the slides are in withdrawn position and will be broken when the slides cover the transparent portions of the mirror.

8. In a mirror, in combination, a mirror side portions of which are transparent, opaque slides capable of movement across said transparent portions, electric lighting means behind the device so positioned that light emitted thereby will pass through said transparent portions when said slides are withdrawn from across said transparent portions, means whereby said light will be directed toward the central portion of the front of the mirror and means whereby the electric lighting circuit will be made when the slides are in withdrawn position and will be broken when the slides cover the transparent portions of the mirror.

9. In a mirror, in combination, a mirror side portions of which are transparent, mirrored slides capable of movement across said transparent portions, electric lighting means behind the device so positioned that light emitted thereby will pass through said transparent portions when said slides are withdrawn from across said transparent portions and means whereby the electric lighting circuit will be made when the slides are in withdrawn position and will be broken when the slides cover the transparent portions of the mirror.

10. In a mirror, in combination, a mirror side portions of which are transparent, opaque slides capable of movement across said transparent portions, electric lighting means behind the device so positioned that light emitted thereby will pass through said transparent portions when said slides are withdrawn from across said transparent portions and means whereby the movement of the slides will automatically make and break the electric lighting circuit.

11. In a mirror, in combination, a mirror side portions of which are transparent, opaque slides capable of movement across said transparent portions, electric lighting means behind the device so positioned that light emitted thereby will pass through said transparent portions when said slides are withdrawn from across said transparent portions, means whereby such reflected light will be directed toward the central portion of the mirror and means whereby the movement of the slide will automatically make and break the electric lighting circuit.

Signed at New York city, in the county of New York and State of New York, this 7th day of February, 1928.

STANLEY RAUH.